Feb. 2, 1954   J. L. OUWELTJES   2,668,252
ELECTRIC LAMP
Filed Nov. 23, 1951
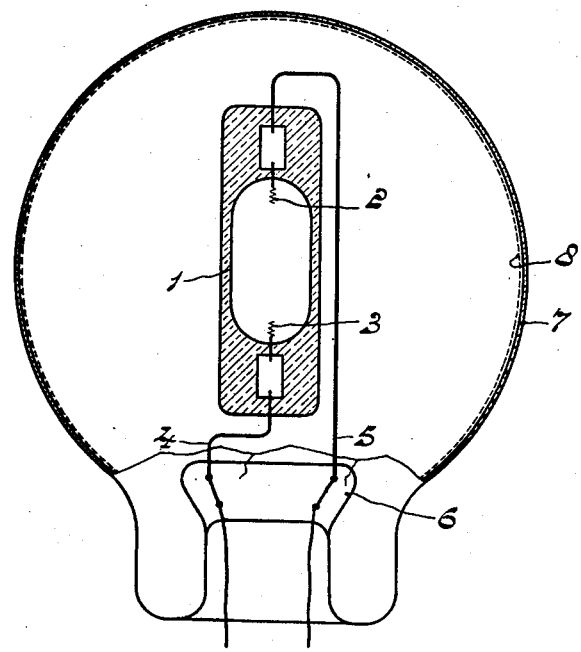
INVENTOR
Jan Laurens Ouweltjes
BY
AGENT Patented Feb. 2, 1954

2,668,252

UNITED STATES PATENT OFFICE 2,668,252

ELECTRIC LAMP

Jan Lourens Ouweltjes, Eindhoven, Netherlands, assignor to Hartford National Bank and Trust Company, Hartford, Conn., as trustee Application November 23, 1951, Serial No. 257,778

Claims priority, application Netherlands January 6, 1951

3 Claims. (Cl. 313—25)

This invention relates to electric lamps comprising a high-pressure mercury vapour discharge tube arranged within a hermetically sealed bulb, that wall of the bulb which is adjacent the discharge tube being coated with a luminescent substance and the space between discharge tube and bulb being filled with gas.

Such lamps, which are often referred to as fluorescent high-pressure tubes, have a generally spherical bulb the diameter of which is substantially similar to that of an incandescent lamp having an equal wattage. During operation, the bulb temperature considerably exceeds room temperature (20° C.) and may be from 70° C. to 300° C. The intermediate gas is generally nitrogen.

It has been found that under the conditions which occur during operation, that is to say at the operating temperature of the bulb that acts as a support for the luminescent substance and/or with the radiation from the discharge tube incident on the luminescent substance, the luminescence of the luminescent substance described and claimed in co-pending British patent specification No. 1,9417/50 (Ph. 10,749) deteriorates rapidly and permanently. This substance is constituted by a reaction product activated with the use of manganese and obtained by heat, which contains magnesium, arsenic and oxygen, the gram molecule ratio between magnesium oxide (MgO) and arsenic oxide ($As_2O_5$) exceeding 3:1.

According to the invention, an electric lamp comprising a high-pressure mercury vapour discharge tube, arranged within a hermetically sealed bulb, that wall of the bulb which is adjacent the discharge tube being coated with a luminescent substance and the space between discharge tube and bulb being filled with gas, is characterised in that the luminescent substance is a reaction product activated with the use of manganese and obtained by heat, which contains magnesium, arsenic and oxygen, the gram molecule ratio between magnesium oxide and arsenic oxide exceeding 3:1, and that the space between discharbe tube and bulb is filled with carbon dioxide or with a mixture of carbon dioxide and at least one inert gas, the pressure of the carbon dioxide being at least 0.2 cm. of mercury. The inert gases are to be considered to be nitrogen and the rare gases.

It has been surprising to find that the initial luminescence is satisfactorily maintained during the life of the lamp.

The content of manganese in the luminescent substance may range between 0.001 and 5 atomic per cent, reckoned on the quantity of magnesium oxide.

The pressure of the gas contained in the space between discharge tube and bulb is preferably from 0.2 to 70 cms. of mercury.

In order that the invention may be more clearly understood and readily carried into effect, it will now be described more fully with reference to the accompanying diagrammatic drawing, given by way of example.

Referring to the figure, 1 designates a substantially cylindrical high-pressure mercury vapour discharge tube which in normal operation has a wattage of 80 watts and has a discharge envelope of quartz, the internal diameter of which is about 8 mms. The activated electrodes 2 and 3, whose adjacent ends are spaced apart by a distance of about 25 mms., are connected, by means of usual seals shown on the drawing as so-called molybdenum foil seals, to current leads 4 and 5 which in turn are led through a pinch 6 to the outside where they are connected to the terminals of a bipolar lamp cap (not shown), for example of the Edison type. The pinch forms part of a hermetically sealed, substantially spherical glass bulb 7 having a diameter of about 80 mms., and coated on the side adjacent the discharge tube with a layer 8 of a luminescent substance constituted by the above-mentioned magnesium arsenate activated with the use of manganese and having a gram molecule ratio between magnesium oxide and arsenic oxide of about 9:1 and a content of manganese of about 0.1 atomic percent, reckoned on the quantity of magnesium oxide. Owing to its remarkably intense red luminescence, the luminescent substance provides together with the light from the mercury vapour discharge tube, light having a favourable spectrum distribution.

The bulb 7 is filled with technically pure, dry carbon dioxide gas, the pressure of which is about 50 cms. of mercury at room temperature.

In normal operation, the spherical part of the bulb 7 has a temperature of about 180° C. and these parts of the current leads 4 and 5 which adjoin the seals have a temperature of about 400° C.

This lamp exhibits at 0 running hours, originating from the luminescent substance, a red content in the visible light of about 14% which at the end of 2000 running hours is still about 12.5%. If instead of using carbon dioxide use is made of nitrogen or a rare gas, the red content, which at the start is equally high, is lowered at the end of about 100 running hours to 5%.

The pressure of the gas contained in the space between discharge envelope and bulb 7 may, if desired, be considerably reduced, for example to 0.2 cm. of mercury. Low gas pressures of this kind may be used with high pressure mercury vapour discharge tubes which reach the operating temperature at a slow rate, for example those connected in series with a capacitative series-impedance.

What I claim is:

1. An electric lamp comprising a high-pressure mercury vapour discharge tube, a hermetically sealed bulb surrounding said tube and spaced therefrom, a coating on the wall of said bulb of a luminescent substance activated with manganese and containing magnesium, arsenic and oxygen and having a gram molecule ratio between magnesium oxide and arsenic oxide exceeding 3:1, and a filling of carbon dioxide having a pressure of at least 0.2 cm. of mercury in the space between the tube and the bulb.

2. An electric lamp as claimed in claim 1, in which the content of manganese in the luminescent substance ranges between 0.001 and 5 atomic per cent relative to the quantity of magnesium oxide.

3. An electric lamp as claimed in claim 1 in which the pressure of the gas contained in the space between the discharge tube and the bulb is from 0.2 to 70 cms. of mercury.

JAN LOURENS OUWELTJES.

References Cited in the file of this patent

UNITED STATES PATENTS

| Number | Name | Date |
|---|---|---|
| 2,177,755 | Uyterhoeven | Oct. 31, 1939 |
| 2,392,305 | Beese | Jan 8, 1946 |
| 2,494,883 | Kroger | Jan. 17, 1950 |